US006966227B2

United States Patent
Okubo et al.

(10) Patent No.: US 6,966,227 B2
(45) Date of Patent: Nov. 22, 2005

(54) PRESSURE SENSOR, TRANSMITTER, AND TIRE CONDITION MONITORING APPARATUS

(75) Inventors: Youichi Okubo, Gifu-ken (JP); Takashi Nunami, Gifu-ken (JP); Kazunori Sawafuji, Gifu-ken (JP)

(73) Assignee: Pacific Industrial Co., Ltd., Ogaki (JP)

( * ) Notice: Subject to any disclaimer, the term of this patent is extended or adjusted under 35 U.S.C. 154(b) by 5 days.

(21) Appl. No.: 10/729,132

(22) Filed: Dec. 5, 2003

(65) Prior Publication Data

US 2004/0154389 A1 Aug. 12, 2004

(30) Foreign Application Priority Data

Feb. 12, 2003 (JP) .............................. 2003-033462

(51) Int. Cl.[7] .......................... G01L 7/08; G01M 17/02
(52) U.S. Cl. ......................................... 73/715; 73/146
(58) Field of Search ........... 73/715, 146–146.8; 340/442–444

(56) References Cited

U.S. PATENT DOCUMENTS 5,040,561 A * 8/1991 Achterholt ................ 73/146.5
5,040,562 A    8/1991 Achterholt
2004/0085078 A1 * 5/2004 Katou et al. ............... 324/661
2004/0155785 A1 * 8/2004 Okubo et al. .............. 340/626

FOREIGN PATENT DOCUMENTS

DE  3931049      3/1991
EP  03028523.3   5/2004
JP  8-094468     4/1996

* cited by examiner

Primary Examiner—Edward Lefkowitz
Assistant Examiner—Takisha Miller
(74) Attorney, Agent, or Firm—Colin P. Cahoon; Christopher P. O'Hagan; Carstens & Cahoon, LLP

(57) ABSTRACT

A tire condition monitoring apparatus has a pressure sensor that measures air pressure in a tire of a vehicle. The apparatus also has a transmitter that transmits pressure data measured by the pressure sensor, and a receiver that receives and processes data transmitted by the transmitter. The pressure sensor has a diaphragm exposed to air of the tire, and metallic material covering the diaphragm. The transmitter has a power supply circuit and a connecting member. The power supply circuit supplies electricity for activating the transmitter. The connecting member connects the power supply circuit with the metallic material such that the potential of the metallic material is the same as the potential of the power supply circuit.

7 Claims, 3 Drawing Sheets

PRESSURE SENSOR, TRANSMITTER, AND TIRE CONDITION MONITORING APPARATUS

BACKGROUND OF THE INVENTION

The present invention relates to a pressure sensor, a transmitter that has the pressure sensor, and a tire condition monitoring apparatus that has the transmitter.

For example, Japanese Laid-Open Patent Publication No. 8-94468 discloses a structure of a pressure sensor unit, in which a pressure sensor is adhered to a lead terminal that also functions as a shielding member. The pressure sensor is three-dimensionally covered by the lead terminal. This structure prevents the pressure sensor from being affected by outside electromagnetic fields and thus allows the pressure sensor to accurately measure a pressure.

However, the pressure sensor is three-dimensionally covered with the lead terminal, which also functions as a shielding member. This increases the size of the pressure sensor unit. In other words, the structure of the publication cannot reduce a size of a pressure sensor unit that includes a shielding member.

SUMMARY OF THE INVENTION

Accordingly, it is an objective of the present invention to provide a compact pressure sensor that accurately measures a pressure. The present invention also relates to a transmitter having such a pressure sensor and a tire condition monitoring apparatus having such a transmitter.

To achieve the foregoing and other objectives and in accordance with the purpose of the present invention, a pressure sensor having a diaphragm and metallic material is provided. The diaphragm is exposed to gas. The metallic material covers the diaphragm. A predetermined voltage can be applied to the metallic material.

The present invention also provides a transmitter having a pressure sensor that has a diaphragm exposed to gas. The transmitter transmits pressure data detected by the pressure sensor. The transmitter includes a power supply circuit, metallic material, and a connecting member. The power supply circuit supplies electricity to the transmitter. The metallic material covers the diaphragm. The connecting member connects the power supply circuit with the metallic material such that the potential of the metallic material is the same as the potential of the power supply circuit.

Further, the present invention provides a tire condition monitoring apparatus having a pressure sensor that measures air pressure in a tire of a vehicle, a transmitter that transmits pressure data measured by the pressure sensor, and a receiver that receives and processes data transmitted by the transmitter. The pressure sensor includes a diaphragm and metallic material. The diaphragm is exposed to air in the tire. The metallic material covers the diaphragm. The transmitter includes a power supply circuit and a connecting member. The power supply circuit supplies electricity for activating the transmitter. The connecting member connects the power supply circuit with the metallic material such that the potential of the metallic material is the same as the potential of the power supply circuit.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A pressure sensor, transmitters, and a tire condition monitoring apparatus according to the present invention will now be described with reference to the drawings.

Figure 1:
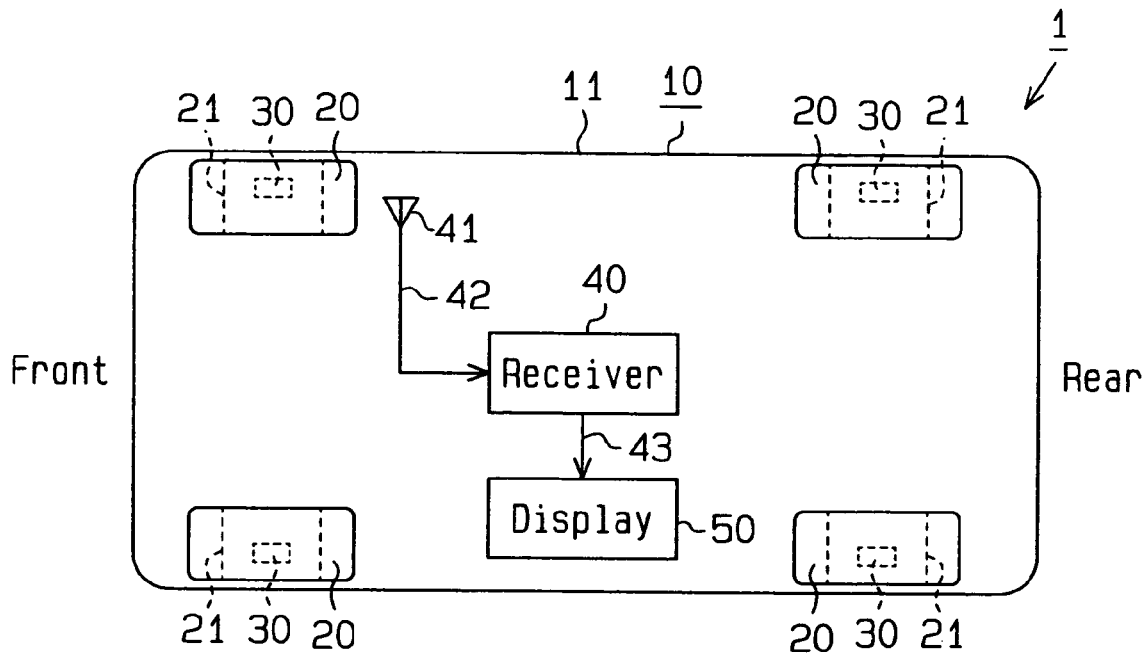
FIG. 1 is a block diagram showing a tire condition monitoring apparatus according to one embodiment of the present invention.

As shown in FIG. 1, the tire condition monitoring apparatus 1 includes four transmitters 30 and a receiver 40. Each transmitter 30 is located in one of the tires 20 of a vehicle 10. The receiver 40 is located on a body frame 11 of the vehicle 10.

Each transmitter 30 is located in the corresponding tire 20 and is fixed, for example, to a wheel 21 of the tire 20. Each transmitter 30 measures the condition of the corresponding tire 20, that is, the pressure of the tire 20. The transmitter 30 then wirelessly transmits data containing air pressure data.

The receiver 40 is located at a predetermined position on the body frame 11 and is activated by electricity of a battery (not shown) of the vehicle 10. The receiver 40 includes a single reception antenna 41. The reception antenna 41 is connected to the receiver 40 with a cable 42. The receiver 40 receives data transmitted by the transmitters 30 through the reception antenna 41.

A display 50 is located in the view of the driver of the vehicle 10, for example, in the passenger compartment. The display 50 is connected to the receiver 40 with a cable 43.

Figure 2:
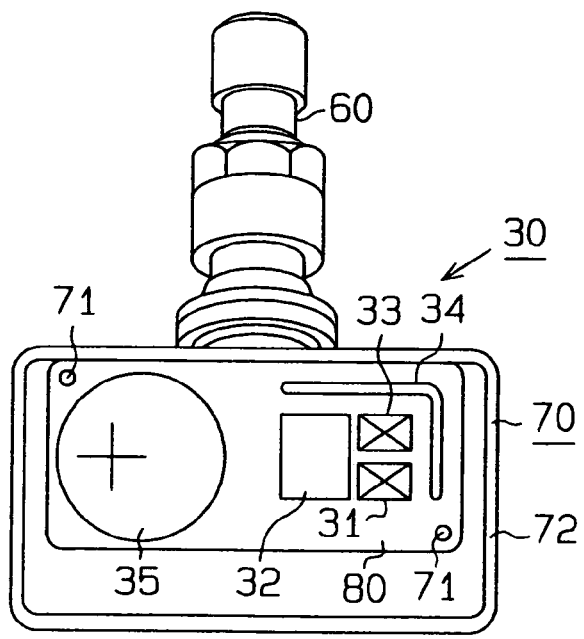
FIG. 2 is a diagrammatic view showing the structure of one of the transmitters shown in FIG. 1.

As shown in FIG. 2, each transmitter 30 is accommodated in a casing 70, that is located below a valve stem 60. Air is injected into the tire 20 through the valve stem 60. The casing 70 is substantially formed into a rectangular box. The casing 70 accommodates a substantially rectangular substrate 80. Electronic elements such as transmission controller 31, a pressure sensor 32, a transmission circuit 33, a transmission antenna 34, and a battery 35 are mounted on the substrate 80. The substrate 80 is fixed to bosses 71 that are integrally formed with the casing 70. The casing 70 has a through hole (not shown) to permit the pressure sensor 32 to measure the air pressure in the tire 20. The casing 70 has an opening 72, which is closed with a lid (not shown) for protecting the electronic elements.

Figure 3:
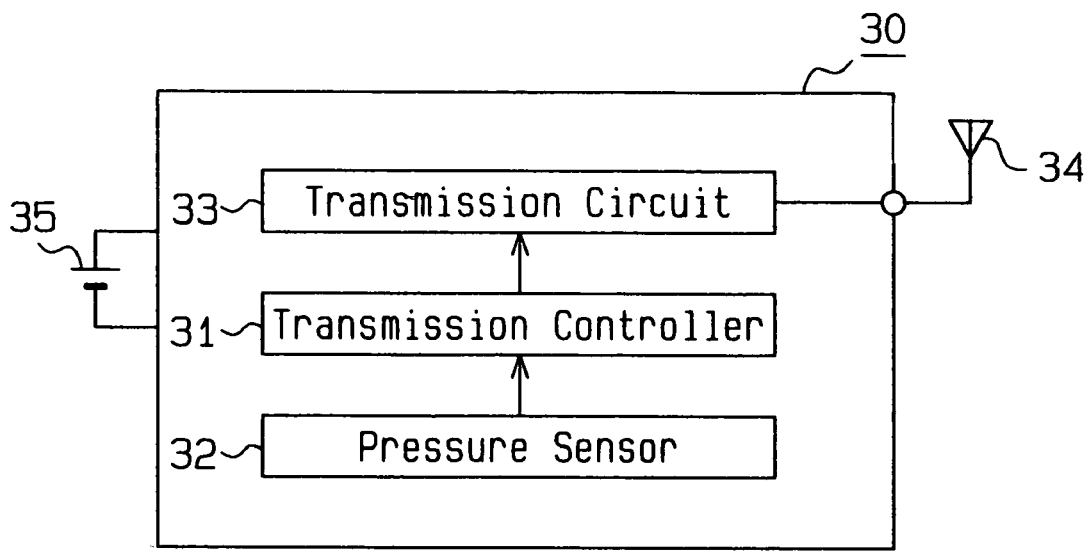
FIG. 3 is a block diagram showing one of the transmitters shown in FIG. 1.

As shown in FIG. 3, each transmitter 30 includes a transmission controller 31, which is a microcomputer. The transmission controller 31 includes, for example, a central processing unit (CPU), a read only memory (ROM), and a random access memory (RAM). A unique ID code is registered in an internal memory, for example, the ROM, of the transmission controller 31. The ID code is used to distinguish the associated transmitter 30 from the other three transmitters 30.

The pressure sensor 32 measures the air pressure in the interior of the associated tire 20 and provides the transmission controller 31 with pressure data, which is obtained from the measurement. The transmission controller 31 sends data containing the air pressure data and the registered ID code to a transmission circuit 33. The transmission circuit 33 encodes and modulates the data sent from the transmission controller 31. The transmission circuit 33 then wirelessly sends the data through a transmission antenna 34. The transmitter 30 is provided with a battery 35. The transmitter 30 is driven by electricity of the battery 35.

Figure 4:
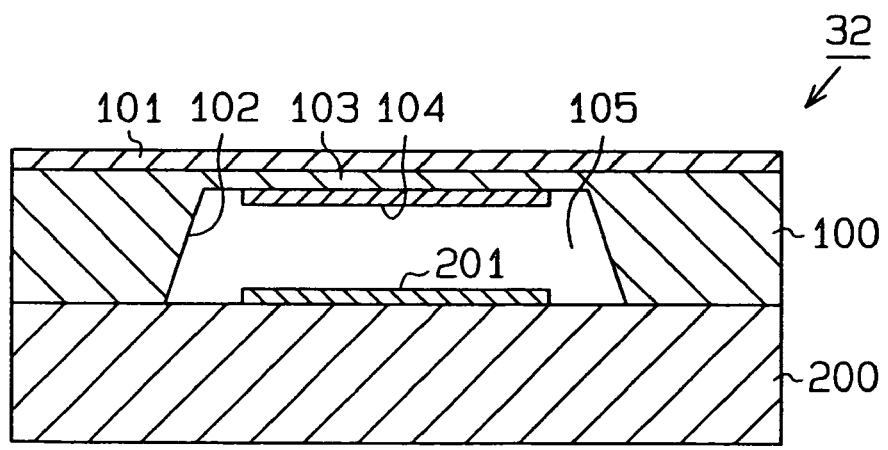
FIG. 4 is a schematic cross-sectional view showing the pressure sensor shown in FIG. 3.

As shown in FIG. 4, the pressure senor 32 is made of ceramic, and has an upper base 100 and a lower base 200. A metallic material film 101 is formed on the outer surface of the upper base 100. A frustoconical recess 102 is formed in a central portion of the upper base 100. As a result, a diaphragm 103 is formed in an central upper portion of the upper base 100. A first inner electrode 104 is formed on the lower surface of the diaphragm 103.

A second inner electrode 201 is formed in a center of the upper surface of the lower base 200. The metallic material film 101, the first inner electrode 104, and the second inner electrode 201 are formed by aluminum deposition. The upper base 100 and the lower base 200 are hermetically attached to each other such that the first inner electrode 104 and the second inner electrode 201 face each other. As a result, a hermetic space 105 is defined between the first inner electrode 104 and the second inner electrode 201. The hermetic space 105 is filled with gas having a predetermined pressure.

The metallic material film 101, which covers the diaphragm 103, is exposed to the air inside the tire 20 through the through hole (not shown) formed in the casing 70. In other words, the metallic material film 101 is exposed to air, which is a measured gas. Therefore, when the air pressure in the tire 20 changes, the difference between the air pressure in the tire 20 and the pressure of the gas filling the hermetic space 105 is changed. Accordingly, the diaphragm 103 is flexed. Then, the distance between the first inner electrode 104 and the second inner electrode 201, which changes a capacitance between the first inner electrode 104 and the second inner electrode 201, accordingly. Therefore, the air pressure in the tire 20 is measured based on the capacitance between the first inner electrode 104 and the second inner electrode 201. That is, the pressure sensor 32 is a capacitance type pressure sensor.

Figure 5:
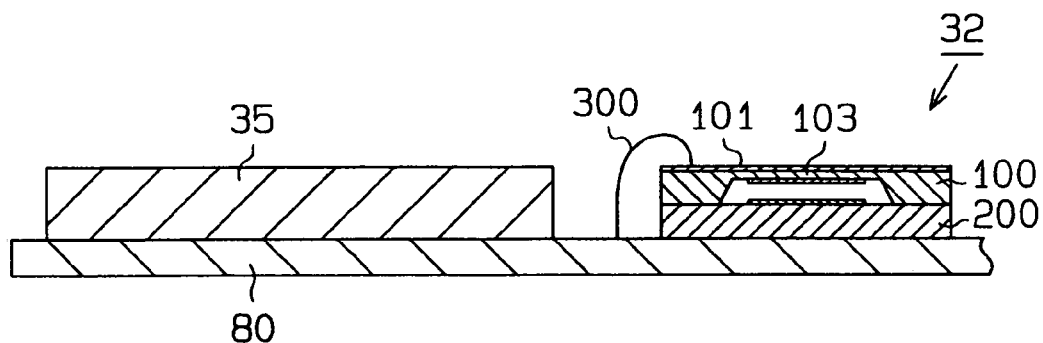
FIG. 5 is a partially cross-sectional view showing the transmitter shown in FIG. 3.

As shown in FIG. 5, the metallic material film 101 on the upper base 100 is connected to the battery 35 with a lead wire 300 and traces of the wiring pattern on the substrate 80. The lead wire 300 and the traces function as connecting means. Specifically, the metallic material film 101 is connected to a power supply potential Vdd (+3V) or a ground potential GND (0V) of the battery 35. As a result, the metallic material film 101 on the upper base 100 is maintained to the same potential as the power supply potential Vdd (+3V) or the ground potential GND (0V) of the battery 35. The ground potential GND (0V) of the battery 35 is connected to a ground potential GND of the transmission circuit 33. The battery 35 and the transmission circuit 33 function as a power supply circuit that supplies electricity to the transmitter 30.

This embodiment has the following advantages.

(1) The metallic material film 101 is formed on the outer surface of the upper base 100 to cover the diaphragm 103. The metallic material film 101 on the upper base 100 is connected to the power supply potential Vdd (+3V) or the ground potential GND (0V) of the battery 35 with the lead wire 300 and the traces on the substrate 80. Accordingly, the metallic material film 101 on the upper base 100 is maintained to the same potential as the potential of the battery 35. As a result, the first inner electrode 104 and the second inner electrode 201 of the pressure sensor 32 are shielded by the metallic material film 101. This structure prevents the pressure sensor 32 from being affected by outside electromagnetic fields and thus allows the pressure sensor 32 to accurately measure the air pressure in the tire 20. Unlike the structure disclosed in Japanese Laid-Open Patent Publication No. 8-94468, where the pressure sensor is three-dimensionally covered with a lead terminal that also functions as a shielding member, the metallic material film 101 on the upper base 100 is connected to the ground potential GND on the substrate 80 with the lead wire 300. Therefore, the size of the pressure sensor 32 is reduced.

(2) Since the size of the pressure sensor 32 is reduced, the size of the transmitter 30 is reduced. Therefore, when attaching the tire 20 to the wheel 21, the bead of the tire 20 is prevented from contacting the casing 70, which accommodates the transmitter 30. Therefore, when attaching the tire 20, the casing 70 and the transmitter 30 are not damaged.

(3) The pressure sensor 32 is scarcely affected by outside electromagnetic fields. This permits the pressure sensor 32 to accurately measure even small changes in the air pressure in the tire 20. Therefore, the transmitter 30 wirelessly transmits accurate air pressure data to the receiver 40.

(4) The receiver 40 receives data through the reception antenna 41 and, based on the received data, causes the display 50 to display air pressure data. This informs a driver of the vehicle 10 of the accurate air pressure data. In other words, the present invention provides the tire condition monitoring apparatus 1, which accurately measures the air pressure in the tire 20.

It should be apparent to those skilled in the art that the present invention may be embodied in many other specific forms without departing from the spirit or scope of the invention. Particularly, it should be understood that the invention may be embodied in the following forms.

The metallic material film 101 on the upper base 100 may be directly connected to the power supply potential Vdd (+3V) or the ground potential GND (0V) of the battery 35 with the lead wire 300, without using the traces on the substrate 80.

Figure 6:
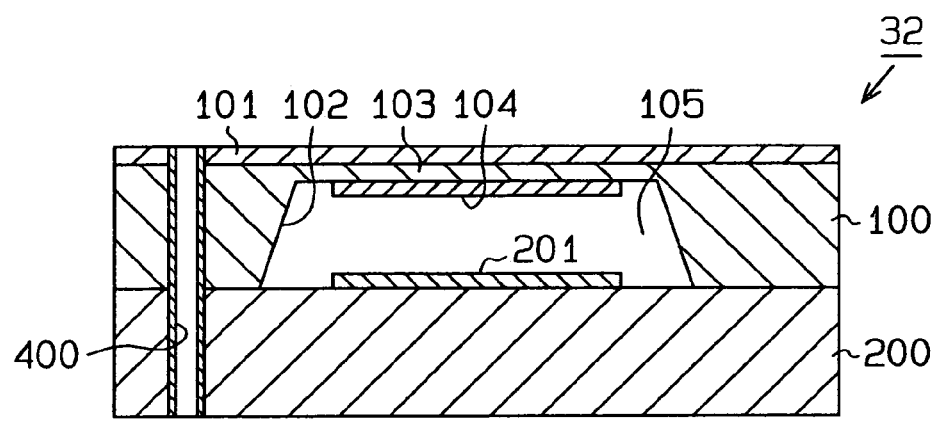
FIG. 6 is a schematic cross-sectional view showing a pressure sensor according to another embodiment.

As shown in FIG. 6, the metallic material film 101 on the upper base 100 may be connected to the power supply potential Vdd (+3V) or the ground potential GND (0V) of the battery 35 with the traces on the substrate 80 and a tungsten plated through hole 400.

Figure 7:
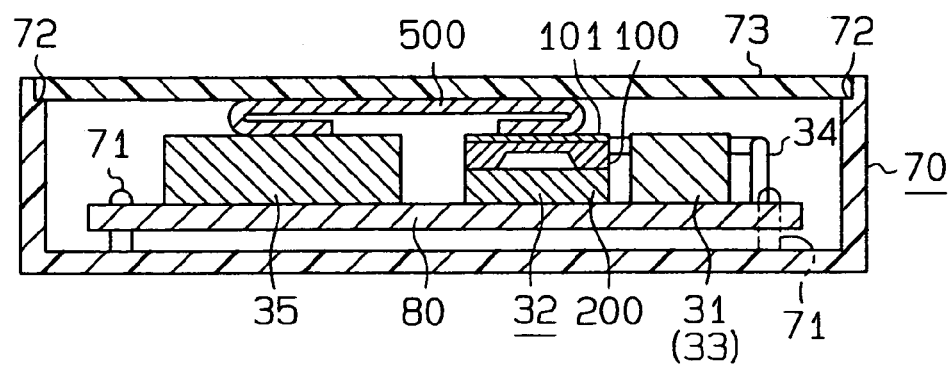
FIG. 7 is a cross-sectional view showing a casing for accommodating a transmitter according to another embodiment.

As shown in FIG. 7, a conductor 500 having bent ends may be provided on a lid 73 of the casing 70. The metallic material film 101 on the upper base 100 may be connected to the battery 35 (for example, a positive terminal) with the conductor 500 when the opening 72 is closed with the lid 73. In this case, the shielding effect is obtained only by closing the opening 72 of the casing 70 with the lid 73 with the conductor 500. Compared to conventional assembly procedure, only a step for attaching the conductor 500 to the lid 73 is added. In other words, no complicated step is added to the procedure for obtaining the shielding effect. Thus, with the structure of the lid 73 having the conductor 500, the transmitter 30 is easily assembled with the casing 70.

In the illustrated embodiment, the metallic material film 101 is formed on the entire upper surface of the upper base 100. However, the metallic material film 101 may be formed on a part of the upper surface of the upper base 100 to cover the diaphragm 103. That is, the metallic material film 101 may be formed only on a center portion of the upper surface of the upper base 100.

Therefore, the present examples and embodiments are to be considered as illustrative and not restrictive and the invention is not to be limited to the details given herein, but may be modified within the scope and equivalence of the appended claims.

What is claimed is:

1. A transmitter comprising a pressure sensor that has a diaphragm exposed to gas, wherein the transmitter transmits pressure data detected by the pressure sensor, the transmitter comprising:
    a power supply circuit for supplying electricity to the transmitter;
    metallic material covering the diaphragm; and
    a connecting member, wherein the connecting member connects the power supply circuit with the metallic material such that the potential of the metallic material is the same as the potential of the power supply circuit, wherein the diaphragm is formed on a ceramic base, and wherein the connecting member is metal plating on an inner surface of a through hole formed in the base.

2. The transmitter according to claim 1, wherein the transmitter is provided in a tire of a vehicle, and wirelessly transmits pressure data representing a condition of the tire.

3. A tire condition monitoring apparatus, comprising:
    the transmitter according to claim 2; and
    a receiver, wherein the receiver receives data transmitted by the transmitter with a reception antenna, and processes the received data.

4. A tire condition monitoring apparatus comprising a pressure sensor that measures air pressure in a tire of a vehicle, a transmitter that transmits pressure data measured by the pressure sensor, and a receiver that receives and processes data transmitted by the transmitter,
    wherein the pressure sensor includes:
        a diaphragm exposed to air in the tire; and
        metallic material covering the diaphragm,
    wherein the transmitter includes:
        a power supply circuit that supplies electricity for activating the transmitter; and
        a connecting member, wherein the connecting member connects the power supply circuit with the metallic material such that the potential of the metallic material is the same as the potential of the power supply circuit, wherein the diaphragm is formed on a ceramic base, and wherein the connecting member is metal plating on an inner surface of a through hole formed in the base.

5. The tire condition monitoring apparatus according to claim 4, wherein the power supply circuit comprises a battery.

6. The tire monitoring apparatus according to claim 5, wherein the metallic material is connected to either a power supply potential or a ground potential of the battery.

7. The tire condition monitoring apparatus according to claim 4, wherein the metallic material is a film formed by aluminum deposition.

* * * * *